(12) United States Patent
Jamal et al.

(10) Patent No.: US 8,975,464 B2
(45) Date of Patent: Mar. 10, 2015

(54) HEAT RECOVERY FROM SORBENT-BASED $CO_2$ CAPTURE

(75) Inventors: Aqil Jamal, Richmond, TX (US); Raghubir P. Gupta, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 13/993,903

(22) PCT Filed: Dec. 16, 2011

(86) PCT No.: PCT/US2011/065340
§ 371 (c)(1),
(2), (4) Date: Sep. 18, 2013

(87) PCT Pub. No.: WO2012/083108
PCT Pub. Date: Jun. 21, 2012

(65) Prior Publication Data
US 2014/0005460 A1  Jan. 2, 2014

Related U.S. Application Data

(60) Provisional application No. 61/424,437, filed on Dec. 17, 2010.

(51) Int. Cl.
*F02M 25/07* (2006.01)
*B01D 53/04* (2006.01)
*B01D 53/62* (2006.01)

(52) U.S. Cl.
CPC .............. *F02M 25/07* (2013.01); *B01D 53/04* (2013.01); *B01D 53/62* (2013.01); *B01D 2251/304* (2013.01); *B01D 2251/606* (2013.01); *B01D 2257/504* (2013.01); *B01D 2258/0283* (2013.01); *B01D 2259/40088* (2013.01); *Y02C 10/04* (2013.01); *Y02C 10/08* (2013.01)
USPC ........... 585/824; 585/823; 585/833; 585/854; 585/860

(58) Field of Classification Search
CPC ................... B01D 2257/504; B01D 2251/606; B01D 52/04; B01D 53/62
See application file for complete search history.

(56) References Cited

U.S. PATENT DOCUMENTS

| | | | |
|---|---|---|---|
| 4,336,159 A | 6/1982 | Winter | |
| 2010/0029466 A1* | 2/2010 | Woodhouse | 502/55 |
| 2013/0333391 A1* | 12/2013 | Sundaram et al. | 60/783 |
| 2014/0105809 A1* | 4/2014 | Okumura et al. | 423/437.1 |

FOREIGN PATENT DOCUMENTS

| | | |
|---|---|---|
| EP | 1 275 429 | 1/2003 |
| JP | 2010-88982 | 4/2010 |

* cited by examiner

*Primary Examiner* — Tam M Nguyen
(74) *Attorney, Agent, or Firm* — Womble Carlyle Sandridge & Rice, LLP

(57) ABSTRACT

The present invention provides a method of increasing the efficiency of exothermic $CO_2$ capture processes. The method relates to withdrawing heat generated during the exothermic capture of $CO_2$ with various sorbents via heat exchange with a working fluid. The working fluid is provided at a temperature and pressure such that it is in the liquid state, and has a vaporization temperature in a range such that the heat arising from the reaction of the $CO_2$ and the sorbent causes a phase change from liquid to vapor state in whole or in part and transfers heat from to the working fluid. The resulting heated working fluid may subsequently be used to generate power.

13 Claims, 1 Drawing Sheet

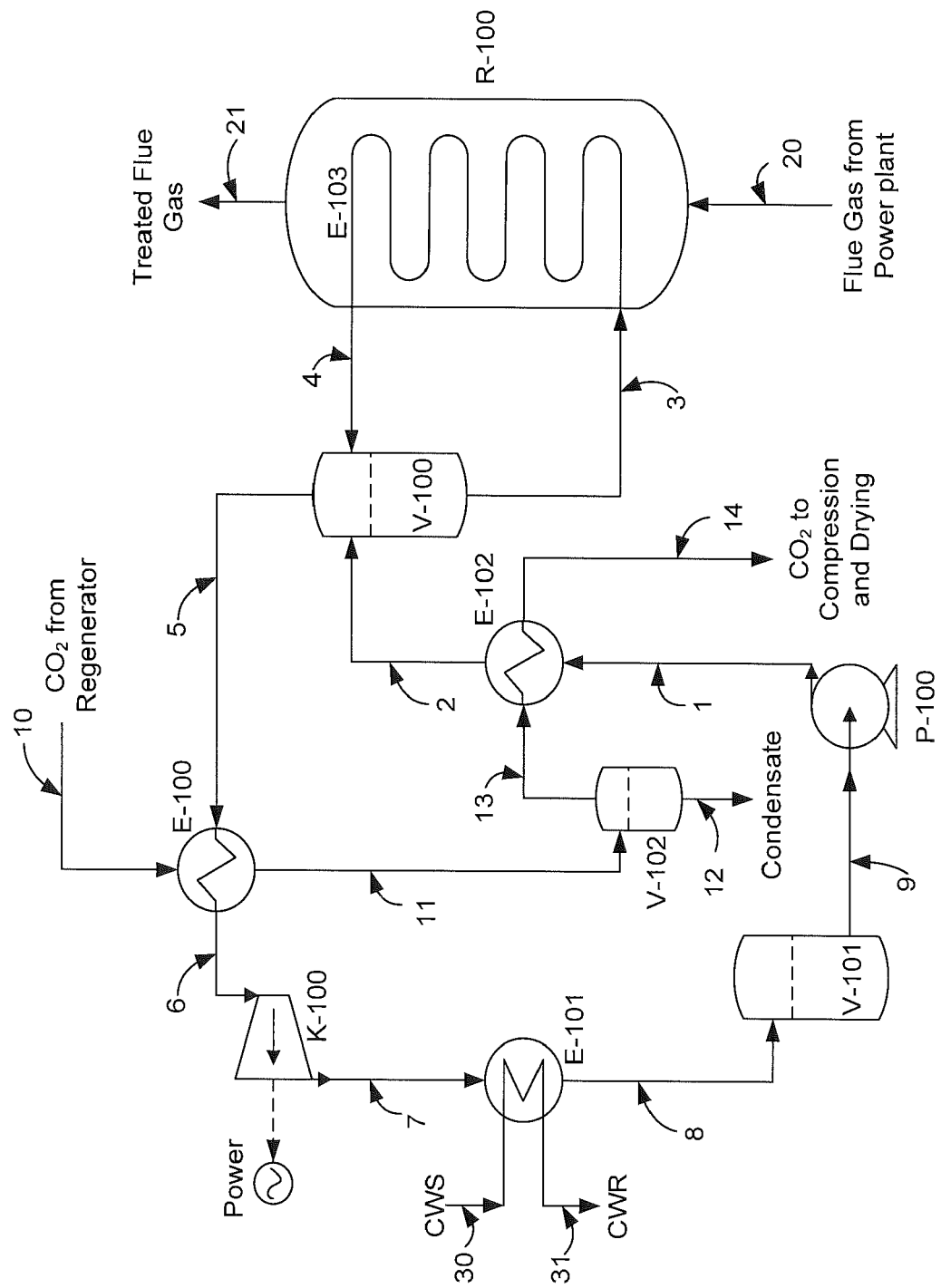

HEAT RECOVERY FROM SORBENT-BASED CO₂ CAPTURE

FEDERALLY SPONSORED RESEARCH OR DEVELOPMENT

This invention was made with United States Government Support under Grant No. DE-FC26-07NT43089, awarded by the Department of Energy. The United States Government has certain rights in this invention.

FIELD OF THE INVENTION

The present invention relates to a method of reducing the parasitic energy load associated with $CO_2$ capture from industrial point sources such as coal-based power plant flue gas. Specifically, it relates to the use of a working fluid to recover heat generated during the capture of $CO_2$ with various sorbents via heat exchange. The resulting heated working fluid may subsequently be used to generate power.

BACKGROUND OF THE INVENTION

Combustion of fossil fuels is reported to be a major cause of the increased concentration of $CO_2$ in the atmosphere. Although research is ongoing to improve energy efficiency and to substitute low-carbon fuels to combat this problem, these methods will likely be insufficient to limit the growth of atmospheric $CO_2$ concentrations to an acceptable level. New technologies to separate and sequester $CO_2$ that is generated are therefore being pursued.

The Department of Energy has reported that existing $CO_2$ capture technologies are not cost-effective when considered in the context of large power plants. The net electricity produced from existing plants would be significantly reduced upon implementation of any of these $CO_2$ capture technologies, since a high percentage of the power generated by the plant would have to be used to capture and compress the $CO_2$.

For example, some technologies utilize various sorbents to sequester $CO_2$ from power plant flue gas via chemical reaction and conversion. This method for the capture of $CO_2$ involves a reaction that can be exothermic. Thus, although $CO_2$ capture is achieved, a new problem arises in the form of a need for cooling the system to keep the absorber temperature in a desired range (e.g., below about 140° F. to 150° F.). Typically, this heat could be removed through the use of cooling water. Additionally, after use, the sorbents may require regeneration for reuse, which requires addition of heat, typically supplied by borrowing low pressure (about 30-50 psig) steam from the steam cycle of the power plant. Accordingly, the overall efficiency of a power plant that includes this type of $CO_2$ capture technology may be diminished by as much as 10 to 15% compared to that of a power plant without any $CO_2$ capture technology in place.

Therefore, it would be beneficial to develop a more efficient $CO_2$ capture method. Specifically, it would be beneficial to develop a new method by which heat generated in the $CO_2$ capture process could be used to generate power, and thus offset the parasitic energy load associated with traditional $CO_2$ capture technologies.

SUMMARY OF THE INVENTION

In one aspect of the present invention is provided a method for increasing energy efficiency of $CO_2$ capture from a gas stream containing $CO_2$. In certain embodiments, the method can involve contacting a $CO_2$-containing gas stream with a sorbent, such as in an adsorber, wherein the $CO_2$ reacts with the sorbent and at least a portion of the $CO_2$ is removed from the gas stream. Such reaction may generate heat. The method further may comprise withdrawing heat from the adsorber via heat exchange with a working fluid. Preferably, the working fluid is at a temperature and pressure such that the working fluid is in the liquid state, and has a vaporization temperature in a range such that the heat in the adsorber arising from the reaction of the $CO_2$ and the sorbent causes a phase change in the working fluid from liquid to vapor state and transfers heat from the adsorber to the working fluid, thus forming a heated, vaporized working fluid. In some embodiments, heat contained in the heated, vaporized working fluid may be converted to power. For example, this power conversion may comprise expanding the heated, vaporized working fluid across a turbine. In certain embodiments of the present invention, the power produced is at least about 2% of net power production capacity of a power plant incorporating such a method.

The heated, vaporized working fluid and/or the expanded vapors may be further cooled and/or pressurized so as to produce a liquid working fluid. In some embodiments, the heated vaporized working fluid and/or expanded vapors may be condensed in a heat exchanger, for example, using water and/or air as cooling medium to give a condensed (i.e., liquid) working fluid. In some embodiments, the condensed working fluid may then be pressurized to initial pressure to be sent back to the adsorber.

In some embodiments of the present invention, the working fluid is pressurized to a pressure of about 100 to about 500 psia prior to said heat exchange. In certain embodiments of the invention, the working fluid is pressurized such that it has a boiling point of about 100° F. to about 180° F. at a pressure of about 100 psia to about 500 psia. In one specific embodiment of the invention, the working fluid comprises propane. In one specific embodiment, the working fluid is liquefied petroleum gas. In certain embodiments, the sorbent comprises a sodium carbonate-based sorbent or an amine enriched solid sorbent.

In some aspects, the method further comprises regenerating the sorbent. In some embodiments, the method further comprises withdrawing further heat. For example, additional heat may be recovered by the heated, vaporized working fluid by heat exchange with a heated gas stream produced by regenerating the sorbent.

BRIEF DESCRIPTION OF THE DRAWING

FIG. 1 is a process flow diagram of a system according to one embodiment of the present invention for the capture of $CO_2$ and associated cycling of propane (PROP) as a working fluid for a power plant producing 630 MWe net electric power with $CO_2$ capture.

DETAILED DESCRIPTION OF THE INVENTION

The present invention now will be described more fully hereinafter with reference to the accompanying drawings, in which some, but not all embodiments of the inventions are shown.

Indeed, these inventions may be embodied in many different forms and should not be construed as limited to the embodiments set forth herein; rather, these embodiments are provided so that this disclosure will satisfy applicable legal requirements. Like numbers refer to like elements.

In one embodiment of the present invention is provided a method of increasing energy efficiency of exothermic $CO_2$ capture methods. In general, such exothermic $CO_2$ capture methods typically comprise contacting a $CO_2$ containing fluid stream with a sorbent such that at least some of the $CO_2$ from the fluid stream reacts with the sorbent and is thereby removed from the fluid stream. In some embodiments, the reaction of $CO_2$ from the fluid stream with the sorbent may take place within a specific apparatus, such as an adsorber apparatus. As the reaction is exothermic, it can be useful to remove heat from the system by a variety of means.

In some embodiments, it can be useful to use a working fluid to withdraw heat generated by the capture of $CO_2$ with a solid sorbent. Preferably, the working fluid is provided in a state that maximizes the amount of heat that is withdrawn from the system. For example, the working fluid may be provided in a liquid state such that the heat generated by the $CO_2$ capture converts the liquid working fluid to its vapor state. Advantageously, the working fluid also may be used throughout the system to provide one or more further functions. For example, the working fluid may be used to withdraw even further heat from the overall sorbent system. In some embodiments, the working fluid may be used to remove heat from the regeneration of the sorbent. Still further, the working fluid may be used in a power production method. For example, the working fluid can be used with a turbine to produce energy. Preferably, the working fluid is continuously cycled through the system, as described herein, to remove heat and/or produce energy. Of course, one or more of the described steps may be combined, or may be divided into multiple steps, and such would be encompassed by the invention. Further, one or more additional steps may be added during the process, and such also would be encompassed by the invention.

One exemplary embodiment of the present invention is illustrated in FIG. 1, which shows a schematic diagram of a propane working fluid cycle. The illustrated is used herein as an example for discussion and should not be construed as necessarily limiting of the invention. The specific components of the cycle may be varied, as is described in more detail below.

Referring to the embodiment of the present invention depicted in FIG. 1, propane is specifically used as the working fluid. As an initial step, the propane is typically pumped to a predetermined pressure such that it is in liquid state. The liquid propane (3) enters the heat exchange coils (E-103) arranged within an adsorber unit (R-100). Within the adsorber unit, a $CO_2$ containing stream is brought into contact with the sorbent, which in this embodiment is sodium carbonate. The reaction between $CO_2$ and the sorbent within adsorber unit R-100 to give treated flue gas (21) produces heat, which is withdrawn with the propane working fluid via suitable heat exchange means (E-103). The reaction of sodium carbonate and $CO_2$ produces heat in the range of about 130° F.-about 160° F. Thus, the working fluid (propane in this embodiment), is provided in a state such that the maximum amount of heat may be withdrawn across this temperature range. Preferably, the propane is provided at a pressure such that it is in the liquid state prior to contacting the adsorber and will transition from the liquid state to the vapor state in the temperature range in the adsorber and thus remove the maximum amount of heat possible in making this state transition. In this embodiment, wherein sodium carbonate is the sorbent and propane is the working fluid, the working fluid may be vaporized at about 370 psia and about 140° F. in the heat exchanger coils located within the adsorber.

The heated, partially vaporized propane exiting the heat exchange coils in the adsorber (E-103) is sent to gas-liquid separator (V-100) where propane vapors are disengaged from the liquid. In certain embodiments, the sorbent may be subjected to a regeneration process, which requires heat, but which also produces a hot $CO_2$ stream (10) that contains water vapor. The working fluid can be used to remove the heat from this hot $CO_2$ stream (10) as well. Specifically, the saturated vaporized propane (5) exiting V-100 is further heated ("superheated") by exchanging heat from the regenerator off gas stream (10) containing predominantly $CO_2$ and water vapor in the gas-gas exchanger E-100. A fraction of the water vapor in the regenerator off gas stream is condensed as it passes through E-100. The combined two-phase stream (11) is sent to a separator V-102, yielding a condensed water stream (12) and a $CO_2$ stream (13). The $CO_2$ stream is then sent to heat exchanger E-102 to pre-heat the propane feed to the adsorber to about 130° F.-about 140° F. In this example the regenerator off-gas superheats the vaporized propane, for example, to a temperature of about 180° F.

The superheated propane vapors (6) are expanded over a turbine (K-100) and the resulting propane vapors are brought to a lower overall pressure, producing power. In this particular embodiment, the superheated propane vapors are expanded from a pressure of 355 psia to 215 psia over the turbine, producing about 37.5 MWe of power.

The expanded propane vapors (7) are cooled, e.g., by passing them through a condenser (E-101), wherein the propane vapors are cooled using cooling water (CWS) to give liquid propane (8) at a pressure of about 210 psia. In one embodiment, the propane is cooled to a temperature of about 90° F. At this point, the working fluid has completed a cycle wherein it was used to remove heat from the adsorber and also to remove heat from the regeneration of the sorbent, as well as to produce energy, a portion of which may be used in carrying out the overall process.

The working fluid is recycled for use again in the cycle. Liquid propane (9) is pumped by pump P-100 to a higher pressure, and continues in the cycle as liquid propane (1). At this point, the pressure of the liquid propane is increased to about 370 psia. Before beginning the $CO_2$ capture cooling cycle again, the liquid propane is further heated (i.e., pre-heated) to about 130° F.-about 140° F. in E-102 as described above. It may pass through separator V-100 prior to being directed back into the adsorber unit (E-103).

The step of further heating (i.e., "pre-heating") the liquid propane prior to beginning the $CO_2$ capture cooling cycle is for the purpose of bringing the temperature of the working fluid close to the temperature at which it undergoes a phase change from liquid to gas. The temperature to which the liquid propane is pre-heated may be comparable to the temperature within the adsorber as a result of the heat generated by the reaction of sodium carbonate and $CO_2$. However, the pre-heating step is important in preferred embodiments, as it allows for maximum heat to be withdrawn from the adsorber by the working fluid due to the fact that fluids in general may withdraw a greater amount of heat at the point of phase change from liquid to gas.

The heat cycles of the present invention may include systems comprising any number of components for the generation and/or consumption of energy. The components may be arranged in any practical order that allows one or more steps to benefit from the use of a working fluid such as that described herein.

In general, the present invention provides a method by which a working fluid is used to withdraw heat generated by exothermic $CO_2$ capture via heat exchange. The $CO_2$ capture may be performed by any method known in the art. For example, in some embodiments, a $CO_2$-containing fluid is brought into contact with a sorbent. The sorbent may be any material capable of reacting with $CO_2$ via chemical adsorption, physical adsorption, or a combination of the two effects. In preferred embodiments, the sorbent reacts with $CO_2$ at least via chemical adsorption. In some embodiments, the sorbent may react with $CO_2$ at temperatures of about 140° F. to about 175° F. In certain embodiments, the sorbent may react with $CO_2$ to produce heat. In some embodiments, the sorbent is a solid sorbent. In some embodiments, the sorbent comprises a solid sorbent that generates heat upon $CO_2$ capture via reaction with the $CO_2$.

The sorbent may be organic or inorganic based. It may be derived from natural sources or may be synthetically produced. In some embodiments, the sorbent may be a supported sorbent (i.e., a sorbent on an inert support material, e.g., ceramic, resin, molecular sieves, etc.). In one embodiment, the sorbent comprises an amine-based sorbent (e.g., an amine-enriched solid sorbent). In another embodiment, the sorbent comprises a carbonate-based sorbent. In other embodiments, the sorbent comprises a carbon-based sorbent, a soda lime based sorbent, a solid oxide-based sorbent, an alkali metal hydroxide-based sorbent, or an alkali metal carbonate-based sorbent. In some embodiments, the sorbent may comprise a mixture of one or more $CO_2$ sorbents. In some embodiments, the sorbent may further comprise a sorbent for one or more additional components that may be present in the $CO_2$-containing fluid stream.

One example of a sorbent that may be used according to the methods of the present invention is sodium carbonate. Sodium carbonate is an example of a solid sorbent that chemically reacts with $CO_2$ in an exothermic reaction. Sodium carbonate reacts with $CO_2$ and water vapor contained in flue gas at temperatures of about 60° F. to about 80° F. to form sodium bicarbonate ($NaHCO_3$) and/or an intermediate salt (Wegscheider's salt, $Na_2CO_3 \cdot 3NaHCO_3$).

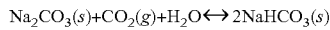

$$Na_2CO_3(s) + CO_2(g) + H_2O \leftrightarrow 2NaHCO_3(s)$$

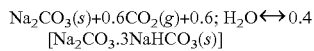

$$Na_2CO_3(s) + 0.6CO_2(g) + 0.6\ H_2O \leftrightarrow 0.4\ [Na_2CO_3 \cdot 3NaHCO_3(s)]$$

In this embodiment, both forward reactions accomplish $CO_2$ capture, while the reverse reactions result in sorbent regeneration, producing equal molar quantities of $CO_2$ and $H_2O$. Both forward reactions are exothermic. Thermal regeneration of the sorbent produces an off-gas containing equal molar quantities of $CO_2$ and $H_2O$.

In preferred embodiments, the sorbent used in the method described herein is regenerable, meaning that after reaction with $CO_2$, the $CO_2$ can be released and the sorbent may thereby be returned to its original form. In some embodiments, the sorbent may be thermally regenerated. The regeneration of the sorbent is ideally 100%; however, in some embodiments, the regeneration is greater than 99% effective, greater than 95% effective, or greater than 90% effective at removing $CO_2$ and providing regenerated sorbent that may be reused in the $CO_2$ capture process described herein. In some embodiments, the regeneration may be set to occur when the sorbent reaches a pre-set saturation point (e.g., 80% saturated with $CO_2$), or at pre-designated cycle times.

The working fluid may be any fluid that may be provided in conditions sufficient to allow for removal of heat. For example, the working fluid may be provided in a liquid state having a boiling point such that the working fluid may be vaporized by the heat generated in the adsorber arising from the reaction of the $CO_2$ and the sorbent. In other words, the boiling point of the liquid working fluid may be somewhere in the range of ambient temperature to the maximum temperature of the adsorber during the reaction of $CO_2$ with the sorbent. For example, where the sorbent is sodium carbonate, the reaction with $CO_2$ is exothermic, resulting in a temperature of about 140° F. within the adsorber. The working fluid in such an embodiment may be any fluid that may be in the liquid state, having a boiling point of about room temperature to about 140° F. In specific embodiments, the working fluid may be a material that is in the vapor state at ambient temperature and pressure but may be pressurized to be in the liquid state up to a desired temperature for heat removal. For example, in some embodiments, the working fluid may comprise propane, which can be provided in the liquid state under a pressure such that the liquid propane will transition to the vapor state in a temperature range corresponding with the temperature in the adsorber arising from the heat of reaction therein. In some embodiments, the working fluid may comprise liquefied petroleum gas (LPG). The choice of working fluid will thus depend on the specific sorbent used for $CO_2$ capture, as the reaction of $CO_2$ with different sorbents may release different amounts of heat.

In some embodiments, the working fluid comprises two or more fluids mixed together. In certain embodiments, the working fluid is an organic, high-molecular mass fluid. In some embodiments, the working fluid is an alkane-based hydrocarbon. In some embodiments, the working fluid is an alkene-based hydrocarbon. For example, the working fluid may comprise propane, butane, ethane, ammonia, liquefied petroleum gas (LPG), propylene, butane, but-1-ene, but-2-ene, 2-methyl propene, various refrigerants, and mixtures thereof. The purity of the working fluid may vary, so long as the working fluid may be provided in the liquid state such that it will transition from the liquid state to the vapor state at a temperature that is about room temperature to about the maximum temperature of the adsorber.

In some embodiments, the working fluid is a fluid in a state such that it will transition from the liquid state to the vapor state at a temperature of about 70° F. to about 200° F. at a pressure that is about ambient pressure (about 15 psia) to about 500 psia. In other embodiments, the working fluid is a fluid in a state such that it will transition from the liquid state to the vapor state at a temperature in the range of about 100° F. to about 180° F. at a pressure that is about 100 psia to about 500 psia, or at a temperature in the range of about 120° F. to about 150° F. at a pressure that is about 200 psia to about 500 psia. Preferably, the temperature at which the working fluid transitions from the liquid state to the vapor state is relatively close to the maximum temperature of the adsorber. For example, in some embodiments, this temperature may be less than about 20° F. below than the maximum temperature of the adsorber. In other embodiments, this temperature may be less than about 15° F., less than about 10° F., or less than about 5° F. below the maximum temperature of the adsorber.

The initial pressure of the working fluid prior to undergoing heat exchange will be dependent on the nature of the working fluid as well as on the sorbent used to capture the $CO_2$, which will dictate the suitable boiling point range for the working fluid. In certain embodiments, the working fluid has an initial pressure of about ambient pressure (about 15 psia) to about 500 psia. In other embodiments, the initial pressure is about 100 psia to about 500 psia, about 200 psia to about 500 psia, or about 300 to about 400 psia. One of skill in the art will be aware that the boiling point of any given fluid is related to its pressure, and therefore will be able to adjust the pressure of the working fluid such that its boiling point falls within a suitable range, allowing the working fluid to be vaporized by the heat generated from the $CO_2$ capture reaction.

Numerous combinations of sorbents and working fluids are envisioned that fall within the scope of this invention. Any combination of sorbent and working fluid may be used according to the present invention, so long as the working fluid can be in a state such that it will transition from the liquid state to the vapor state in whole or in part, at a temperature of about ambient temperature to the maximum temperature of the adsorber, determined by the heat generated by capture of $CO_2$ by the sorbent. The term "working fluid" as used herein may refer to the fluid in either liquid or vapor form.

In some embodiments, following vaporization of the working fluid via heat exchange, the resulting vaporous working fluid is further heated to produce a "superheated" working fluid. Although various means can be used to heat the working fluid, in one embodiment, the heat may come directly from the process of regeneration of the solid sorbent. For example, sufficient heat may be generated in the regeneration of the sorbent such that the off-gas of the regeneration process can be used to superheat the vaporous working fluid.

In preferred embodiments, the heated or superheated vaporous working fluid can be used to generate power. In some embodiments, this generation of power results from expanding the vaporized working fluid over a turbine. Although the depicted embodiment generates power by expanding the vaporized working fluid over a turbine, other means by which power can be generated are envisioned and encompassed within the present invention. For example, in another embodiment, at a sufficient temperature, the vaporized working fluid may be used to generate steam, which can be converted to electric power.

The amount of power generated by the methods of the present invention may vary. In some embodiments, the vaporous working fluid can be utilized to produce greater than about 10 MWe, greater than about 15 MWe, greater than about 20 MWe, greater than about 25 MWe, greater than about 30 MWe, or greater than about 35 MWe per cycle for a power plant producing 630 MWe net electric power with $CO_2$ capture. In some embodiments, such values particularly can relate to a power plant producing 630 MWe net electric power. Based on this data, however, the invention can be characterized so as to encompass use in power generation facilities of varying capacity. In certain embodiments, the amount of power generated per cycle using the methods of the present invention is at least about 2%, at least about 3%, at least about 4%, at least about 5%, at least about 6%, at least about 7%, at least about 8%, at least about 9%, or at least about 10% of the net power production capacity of the power plant incorporating said methods.

In some embodiments, the working fluid may be subsequently cooled and pressurized such that it is in liquid form at sufficient pressure to be used again in the cycle described herein. In some embodiments, the working fluid is cycled and used more than one time for the cooling of the exothermic $CO_2$ capture reaction and power production cycle described herein. In some embodiments, the working fluid may also be used to withdraw heat from additional processes. For example, the working fluid may come in contact with additional adsorbers to withdraw heat therefrom.

In some embodiments, the working fluid may be used to produce additional power. For example, the working fluid may be expanded over multiple turbines at various stages in the cycle to produce power. In some embodiments, the working fluid may be split into multiple streams such that it may simultaneously be passed through different components and/or used for multiple purposes. Optionally, in such cases, the working fluid may subsequently be recombined. As noted above, the method of the present invention may involve systems comprising any number of components for the generation and/or consumption of energy. The components may be arranged in any practical order that allows one or more step to benefit from the use of a working fluid such as that described herein. In addition, this process may be integrated with peripheral plant equipment to recover additional superheat and convert it to power.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for increasing energy efficiency of $CO_2$ capture from a fluid stream containing $CO_2$, comprising:
   contacting a $CO_2$-containing fluid stream with a sorbent in an adsorber such that the $CO_2$ reacts with the sorbent so that at least a portion of the $CO_2$ is removed from the fluid stream and heat is generated;
   withdrawing heat from the adsorber via heat exchange with a pressurized, liquid working fluid having a vaporization temperature in a range such that the heat in the adsorber arising from the reaction causes a phase change from liquid to vapor and transfers heat from the adsorber to the working fluid, thus forming a heated, vaporized working fluid.

2. The method of claim 1, further comprising converting heat contained in the heated, vaporized working fluid to power.

3. The method of claim 2, wherein said converting comprises expanding the heated, vaporized working fluid across a turbine.

4. The method of claim 2, wherein the power produced is at least about 2% of net power production capacity of a power plant incorporating said method.

5. The method of claim 1, further comprising one or both of cooling and pressurizing the heated working fluid such that it is converted into liquid form.

6. The method of claim 1, wherein the working fluid comprises propane.

7. The method of claim 1, wherein the working fluid is liquefied petroleum gas.

8. The method of claim 1, wherein the vaporization temperature of the pressurized working fluid is from about 100° F. to about 180° F. at a pressure of from about 100 psia to about 500 psia.

9. The method of claim 1, wherein the sorbent comprises a sodium carbonate-based sorbent.

10. The method of claim 1, wherein the sorbent comprises an amine-enriched solid sorbent.

11. The method of claim 1, wherein the working fluid is pressurized to a pressure of about 100 psia to about 500 psia.

12. The method of claim 1, further comprising regenerating the sorbent.

13. The method of claim 12, wherein additional heat is recovered by the heated, vaporized working fluid by heat exchange with a heated gas stream produced by regenerating the sorbent.

* * * * *